United States Patent [19]

Termont et al.

[11] 3,996,999
[45] Dec. 14, 1976

[54] VEHICLE AND HYDRAULIC FLUID RESERVOIR COMBINATION

[75] Inventors: Charles George Termont; Wayne Russel Miller, both of Dubuque, Iowa

[73] Assignee: Deere & Company, Moline, Ill.

[22] Filed: Feb. 22, 1974

[21] Appl. No.: 444,981

[52] U.S. Cl. .............................. 165/41; 165/148; 55/268; 180/66 R; 180/68 R
[51] Int. Cl.² ...................... F28F 1/00; B60K 11/06
[58] Field of Search ...................... 165/41, 42, 148; 180/66 R, 68 R

[56] References Cited
UNITED STATES PATENTS

| | | | |
|---|---|---|---|
| 444,981 | 6/1929 | MacKintosh | 165/148 X |
| 1,852,464 | 4/1932 | Leipert | 180/68 X |
| 2,655,792 | 10/1953 | Lagrange | 165/41 |
| 2,781,859 | 2/1957 | Warren | 180/54 R |
| 3,112,002 | 11/1963 | Van der Lely | 165/41 X |
| 3,203,499 | 8/1965 | Bentz et al. | 165/41 X |
| 3,630,003 | 12/1971 | Ashton | 180/68 R |
| 3,727,712 | 4/1973 | Colloton | 180/68 R |

*Primary Examiner*—Wendell E. Burns
*Assistant Examiner*—Theophil W. Streule, Jr.

[57] ABSTRACT

A hydraulic fluid reservoir is provided on a vehicle for containing fluid for use in the hydraulic system of the vehicle. The hydraulic reservoir is mounted between an upright wall forming a part of the vehicle operator's station and the backside of a water-cooled internal combustion engine. Coupled to the engine on the side remote from the reservoir is a blower-type fan. The reservoir is provided with a centrally located air duct means aligned with the engine and blower fan and the reservoir is so located that the engine-driven fan draws air around and through the reservoir to provide forced convection cooling of the fluid contained in the reservoir. The air duct means are so located relative to outlet and inlet ports of the reservoir that fluid flowing from the inlet to the outlet port will be deflected or baffled by the duct means.

6 Claims, 6 Drawing Figures

U.S. Patent  Dec. 14, 1976  3,996,999
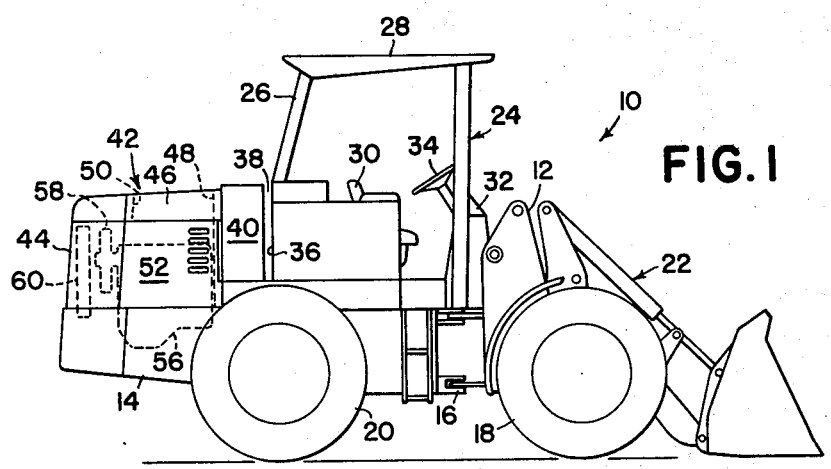
FIG.1
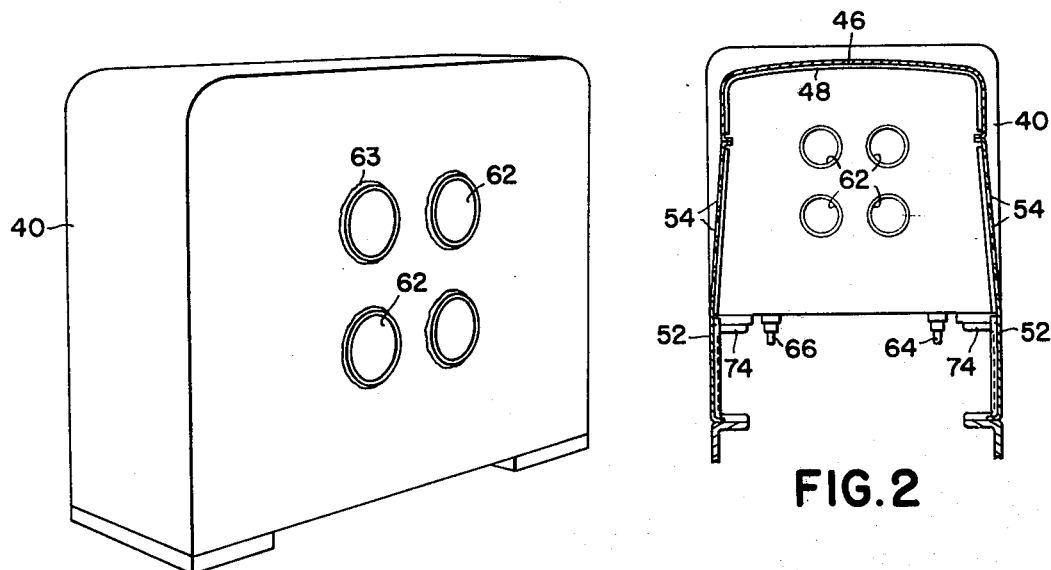
FIG.3
FIG.2
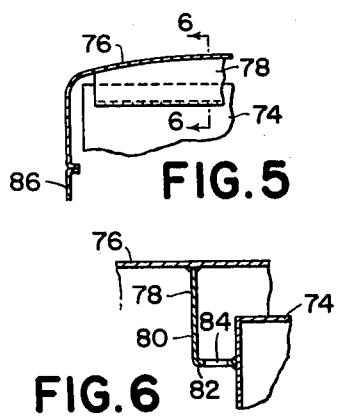
FIG.5
FIG.6
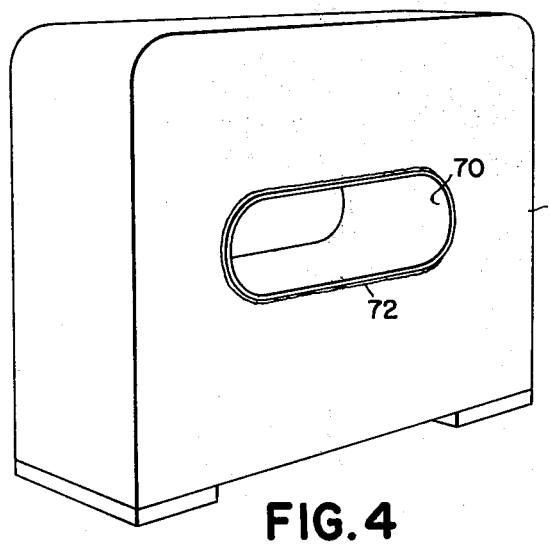
FIG.4

VEHICLE AND HYDRAULIC FLUID RESERVOIR COMBINATION

BACKGROUND OF THE INVENTION

The present invention relates to a hydraulic fluid reservoir and more particularly relates to such a reservoir which is so constructed and located on a vehicle that a fan driven by the vehicle engine draws air across various surfaces of the reservoir to thereby provide forced convection cooling for the fluid contained in the reservoir.

Vehicles are often provided with hydraulically powered elements such as brakes, clutches and transmissions or the like. In the case of industrial vehicles such as tractors or the like, hydraulically controlled equipment is usually mounted on the vehicle. Such wide use of hydraulically operated components necessitates the need for relatively large hydraulic fluid reservoirs to be mounted on the vehicle. Conventionally, such reservoirs have been placed in areas on the vehicle so as to have the exteriors of the reservoirs exposed to ambient air so that heat generated in the oil by its passage through the various components will be dissipated through the reservoir walls to the air when the hydraulic fluid returns to the reservoir. In some instances, this manner of cooling has been found inadequate resulting in a breakdown of the hydraulic fluid which in turn results in poor component performance or even damage to the components.

SUMMARY OF THE INVENTION

According to the present invention there is provided a hydraulic fluid reservoir so constructed and so positioned on a vehicle that forced convection cooling of the fluid in the reservoir takes place. A broad object of the invention is to provide a vehicle with a hydraulic fluid reservoir that is so located that a fan driven by the vehicle engine draws air across a substantial portion of the outer surface area of the reservoir.

Another object is to provide a hydraulic fluid reservoir, as described in the immediately above paragraph, which includes air duct means extending centrally therethrough and located such that the engine fan acts to force air through the duct means.

A further object of the invention is to position the duct means relative to inlet and outlet ports of the reservoir such that fluid when flowing between the inlet and outlet will be baffled by the duct means.

A more specific object of the invention is to provide a hydraulic fluid reservoir as described above which is positioned on a vehicle between the vehicle engine and a wall of the vehicle operator's station, the engine and wall serving to guide air along exterior surface portions of the reservoir.

Another specific object is to provide the reservoir with a rim for supporting one end of a hood disposed over the engine.

Yet another object is to provide a reservoir, as described above, in which the duct means are formed of one or more tubular members having opposite open ends respectively welded to opposite walls of the reservoir such that the one or more tubular members serve as structural members which stiffen the reservoir so that the walls thereof do not bulge when the fluid contained therein is pressurized.

Still another object is to provide a second embodiment wherein the hood extends over and in spaced relationship to the reservoir so as to guide air along a path closely adjacent the reservoir.

These and other objects will become apparent from a reading of the following specification in conjunction with the appended drawings.

BRIEF DESCRIPTION OF THE DRAWINGS

FIG. 1 is a right side elevational view of a vehicle embodying the present invention.

FIG. 2 is a sectional view taken along line 2—2 of FIG. 1.

FIG. 3 is a perspective view of a first form of the reservoir wherein four cylindrical tube members serve as the air ducts of the reservoir.

FIG. 4 is a perspective view of a second embodiment of the reservoir wherein a single oval-shaped tubular member comprises the sole air duct of the reservoir.

FIG. 5 is a sectional view similar to FIG. 2 but showing a modification having a different hood and reservoir relationship.

FIG. 6 is a sectional view taken along line 6—6 of FIG. 5.

DESCRIPTION OF THE PREFERRED EMBODIMENT

Referring to FIG. 1, therein is shown a typical vehicle with which the present invention is adapted for use, the vehicle being indicated in its entirety by the reference numeral 10. The vehicle 10 is an articulated steel loader comprising front and rear frame sections 12 and 14, respectively, interconnected by a vertical pivot assembly 16 and respectively supported upon front and rear pairs of wheels 18 and 20, respectively. A hydraulically operable bucket assembly 22 is mounted in a conventional manner on the front frame section 12. Located on the rear frame section 14 just rearwardly of the pivot assembly 16 is an operator's station 24 including a roll-over protective structure 26 including a top 28 beneath which is located an operator's seat 30 positioned rearwardly of a control console support 32 from which a steering column and wheel assembly 34 project rearwardly to place the steering wheel in easy grasp of an operator positioned in the seat 30. The operator's station 24 is bounded at its rear side by a vertical wall portion 36. Spaced just rearwardly of the wall so as to leave a relatively narrow gap 38 therebetween is a box-shaped reservoir 40. The rearward side of the reservoir 40 forms the forward wall of an engine compartment 42, the rearward end of the compartment being formed by a radiator and fan housing 44 supported at the rear of the rear frame section 14. A longitudinally extending hood 46 forms part of the top of the compartment 42 and is supported at its forward end on a flange 48 formed as an integral part of the reservoir 40 and is supported at its rearward end on a flange 50 forming an integral part of the radiator and fan housing 44. The opposite sides of the compartment 42 are formed in part by opposite side panels 52, the side panels being provided with a plurality of openings 54 for permitting air to be drawn into the compartment in a manner to be described below. Supported on the rear frame section 14 just rearwardly of the reservoir 40 is an internal combustion engine 56. Coupled to the rearward end of the engine 56 is a blower-type fan which is driven by the engine to cause a main stream of air to flow longitudinally of the vehicle through a radiator 62 located just rearwardly of the fan. As will be described in more detail below, the reservoir 40, compartment 42, fan 48, and reservoir 60 cooperate to define a cooling system.

Referring now to FIGS. 2 and 3, it can be seen that the reservoir 40 includes a grouping of four cylindrical tubular air ducts 62 extending longitudinally through a central portion of the reservoir. The air ducts 62 have opposite open ends which are welded as at 63 to front and rear vertical walls of the reservoir. Thus, it will be appreciated that the air ducts 62 serve to stiffen the reservoir. Located in the bottom of the reservoir at opposite sides of the group of ducts 62 are an inlet or return port 64 and an outlet or suction port 66. The air ducts 62 are so located relative to the port 64 and 66 that the inertia of the hydraulic fluid returning through the port 64 will carry a substantial amount of the fluid on a path which carries it against the air ducts to cause the fluid to be mixed with other fluid in the reservoir before exiting through the outlet or suction port 66.

Referring now to FIG. 4, therein is disclosed a reservoir 68 which is box-shaped like the reservoir 40 and varies only from the reservoir 40 in that instead of having a group of air ducts the reservoir structure defines a central oval-shaped tubular duct 70 having opposite open ends and being welded to opposite front and rear side walls of the reservoir 68 through means of weldments such as that shown at 72. Although not visible in FIG. 4, the reservoir 68 includes a flange similar to the flange 48 of the reservoir 40 for providing a support for the front end of the hood 46.

Of importance is the fact that respective fluid capacity volumes of the reservoirs 40 and 68 are at least five times greater than the respective volume between the ends of the ducts 62 and between the ends of the duct 70. Thus, the reservoirs 40 and 68 are capable of holding a large quantity of fluid despite the presence of the ducts 62 and 70.

Referring now to FIGS. 5 and 6, there is shown another embodiment of the reservoir, hood and side panel structure of the vehicle 10 including a reservoir 74 which is identical to the reservoir 40 except that it does not have a flange corresponding to the flange 48. A hood 76 extends completely above the reservoir 74 and is supported thereby through means of a bracket 78 having a vertical portion 80 disposed rearwardly of the reservoir, the portion 80 cooperating with the hood 76 for directing air along a path carrying it over and down along the backside of the reservoir 74. The bracket 78 includes a lower horizontal portion 82 secured as by welding to the backside of the reservoir and provided with a plurality of apertures 84 for allowing the passage of air deflected by the portion 80. Spaced from the opposite sides of the reservoir and extending therebeside below the opposite sides of the hood are opposite side panels 86.

It is important to note that the respective top, rear and opposite side walls of the reservoirs 40, 68 and 74 are exposed to ambient air when the reservoirs are installed on the vehicle 10. Further, the rear frame section 14 comprises transversely spaced side members 74 which the reservoirs bridge when mounted on the vehicle, thus resulting in a large portion of the surface area of the bottom side walls being also exposed to ambient air.

The operation of the invention is briefly summarized as follows, reference not being made to the reservoir 68 since it operates similarly to the reservoir 40. With the vehicle engine 56 operating, the blower fan 58 will likewise be in operation and will cause air to be drawn in from locations therebehind and forced into a mainstream passing longitudinally of the vehicle through the radiator 60. This air acts in the usual way to cool coolant contained in core passages of the radiator to thereby insure that the engine will be properly cooled. The air drawn into the blower fan 58 will come into the engine compartment 42 through any openings that there may be in those components forwardly of the fan defining the compartment, for example the hood 46, the side panels 52, and the hydraulic fluid reservoirs 40. Thus, the four air ducts 62 of the reservoir 40 provide an open path for permitting the flow of air into the engine compartment. Since the vertical wall portion 36 of the operator's station 24 is located in spaced relationship to but adjacent the front side of the reservoir 40, the suction of the blower fan will cause a pressure drop in the gap 38 and cause air to flow across the exposed surfaces of the top, bottom, opposite sides and rear walls of the reservoir before the air enters the ducts 62. Once the air exits from the ducts 62, the rear side of the engine will cause the air to flow sideways across at least a portion of the surface area of the backside of the reservoir surrounding the rear opening of the air ducts.

The momentum of the fluid returning to the reservoir through the inlet return port 64 will cause it to be carried along a path which intersects with the air ducts 62, the latter acting to baffle the returning fluid and to intermix it with the fluid in the reservoir. The return fluid is normally at a higher temperature than the remaining fluid in the reservoir, thus the mixing thereof will result in its temperature being lowered. Also, since this high temperature fluid engages the air ducts 62, it loses heat through the walls of the ducts 62 to the air flowing therethrough.

It will be appreciated that the tubular ducts 62 serve to strengthen the structure of the reservoir 40 which is important since pressurized fluid in the reservoir might bulge the walls of the reservoir and cause the weld seam joining the walls thereof to be weakened.

Referring now to the embodiment shown in FIGS. 5 and 6, the operation will essentially be the same as that aforedescribed except that the hood 76 and side panels 86 will act to confine air flow closely adjacent the top and opposite sides of the reservoir 74 as opposed to the more general flow of air that occurs during operation of the reservoirs 40 and 68. This confined air flow results in an increase in heat transfer. A further departure from the above-described operation is the operation of the bracket 78 which serves not only as a support for the hood 76 but also as a baffle which directs air along a path carrying it down along the backside of the reservoir 74.

We claim:

1. In a vehicle including a longitudinal frame supporting, in longitudinal alignment, an engine, an engine coolant conveying radiator spaced from the engine, a driven fan located adjacent the radiator, an operator's station having an upright transverse wall facing in the direction of the engine, a pair of side walls extending longitudinally at opposite sides of the engine, fan and radiator and joined by a top wall extending over the engine, fan and radiator to thus define a compartment, and a hydraulic fluid reservoir for containing hydraulic fluid for operating various hydraulic functions associated with the vehicle, the improvement comprising: said reservoir being located adjacent to and at least substantially blocking one end of said compartment;

said reservoir including first and second upright, transverse longitudinally spaced walls having open-ended longitudinally extending air duct means passing therethrough and defining air passage means communicating with the compartment; the volume of the air duct means between the open ends thereof being no greater than about one-fifth of the fluid holding volume of the reservoir; said reservoir, compartment, fan and radiator cooperating to define a cooling system; said upright wall of the operator's station being spacedly adjacent the cooling system so as to leave a gap, exposed to ambient air, between the last-named wall and the cooling system, whereby operation of the fan will result in a stream of air being moved through the compartment, duct means and gap.

2. The vehicle defined in claim 1 wherein said reservoir is disposed between the wall of the operator's station and the engine; and said gap is located between the wall of the operator's station and the second upright wall of the reservoir.

3. The vehicle defined in claim 2 wherein said reservoir includes a flange on the first upright wall of the reservoir; and one end of said top wall being supported on said flange.

4. The vehicle defined in claim 2 wherein said top and side walls of the compartment respectively extend beside and are spaced from top and opposite side walls of the reservoir and extend toward the operator's station at least as far as the second upright wall of the reservoir; and bracket means connecting said top wall of the compartment to the reservoir for support thereby and including means for intercepting air flowing through said compartment and deflecting the air on a path carrying it along one of the first and second upright walls of the reservoir.

5. The vehicle defined in claim 1 wherein said reservoir is generally box-shaped and said duct means comprises a single open-ended tubular member which has an oval cross-section elongated in a direction parallel to top and bottom side of the reservoir.

6. The vehicle defined in claim 1 wherein said reservoir has a return fluid inlet and a supply fluid outlet located relative to said duct means such that fluid returning to the reservoir through the return fluid inlet will impinge upon the duct means and will be mixed with other fluid in the reservoir before passing on to the outlet thereby enhancing the cooling property of the reservoir.

* * * * *